Figure 1:
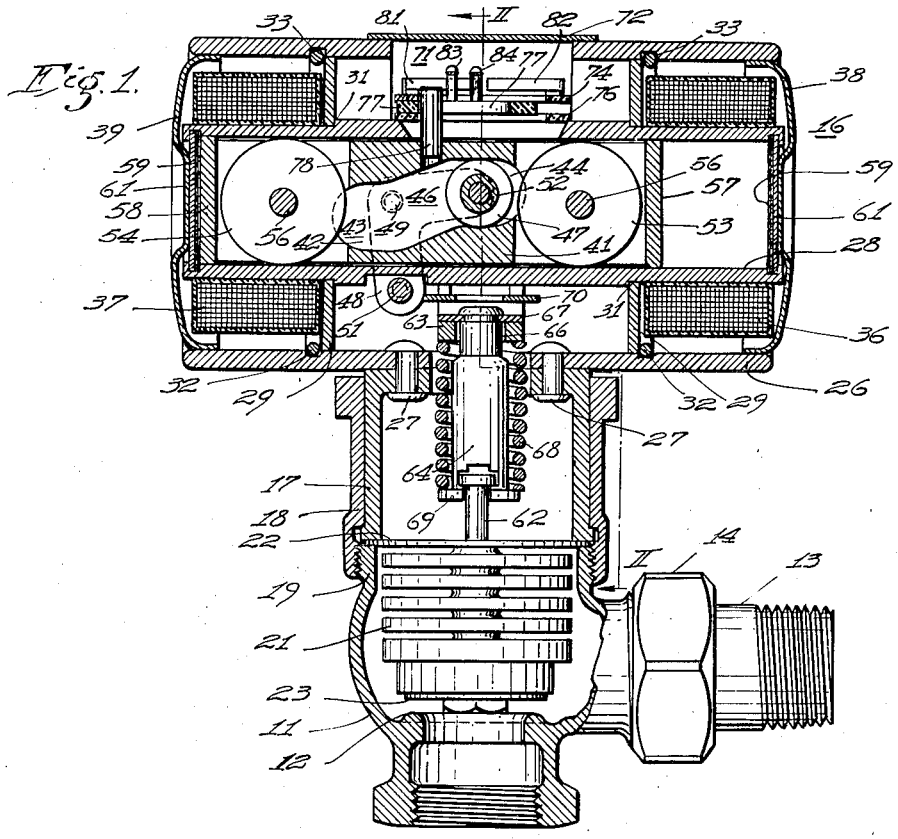

June 13, 1933. W. T. TABB 1,914,181

ELECTROMAGNETIC VALVE

Filed March 2, 1931 2 Sheets-Sheet 1

WITNESSES.

INVENTOR
Warner T. Tabb.
BY
ATTORNEY

June 13, 1933.  W. T. TABB  1,914,181
ELECTROMAGNETIC VALVE
Filed March 2, 1931  2 Sheets-Sheet 2

WITNESSES.
INVENTOR
Warner T. Tabb.
BY
ATTORNEY

Patented June 13, 1933

1,914,181

UNITED STATES PATENT OFFICE

WARNER T. TABB, OF GLOUCESTER, VIRGINIA, ASSIGNOR TO WESTINGHOUSE ELECTRIC & MANUFACTURING COMPANY, A CORPORATION OF PENNSYLVANIA

ELECTROMAGNETIC VALVE

Application filed March 2, 1931. Serial No. 519,630.

My invention relates to valves for controlling heating systems and more particularly to electromagnetic valve-actuating means.

An object of my invention is to provide a relatively simple and highly efficient electromagnetic actuating means for valves applicable to pressure or to vacuum heating systems.

Another object of my invention is to provide an electromagnetic valve-actuating device embodying means for positively holding the valve disk in either its open or its closed position.

Another object of my invention is to provide a valve-actuating means that shall include resilient means for limiting the pressure of the valve disk on its seat.

In practicing my invention, I provide an outer shell, a coaxial inner shell, spaced annular members for holding the inner shell in the outer shell, actuating coils on the inner shell, a reciprocally-movable core in the inner shell fitting loosely therein and having rollers therein the surfaces of which engage the shell, the core having a longitudinally-extending angular slot therein. Means is provided for preventing longitudinal movement of a roller moving in said slot, and a connection is provided between the roller and a valve stem which includes a spring member for positively limiting the pressure of the valve disk on its seat. A control system for the actuating coils is also provided to be controlled by the movements of the core in the inner shell, to ensure that any actuating coil shall be energized momentarily only.

Figure 2:
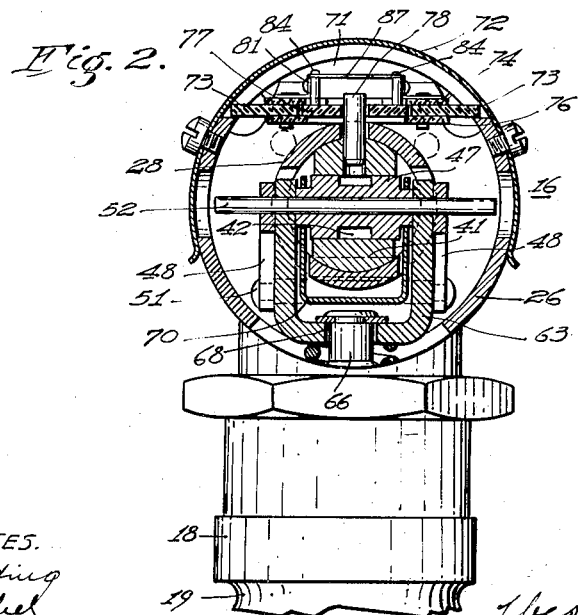
Figure 3:
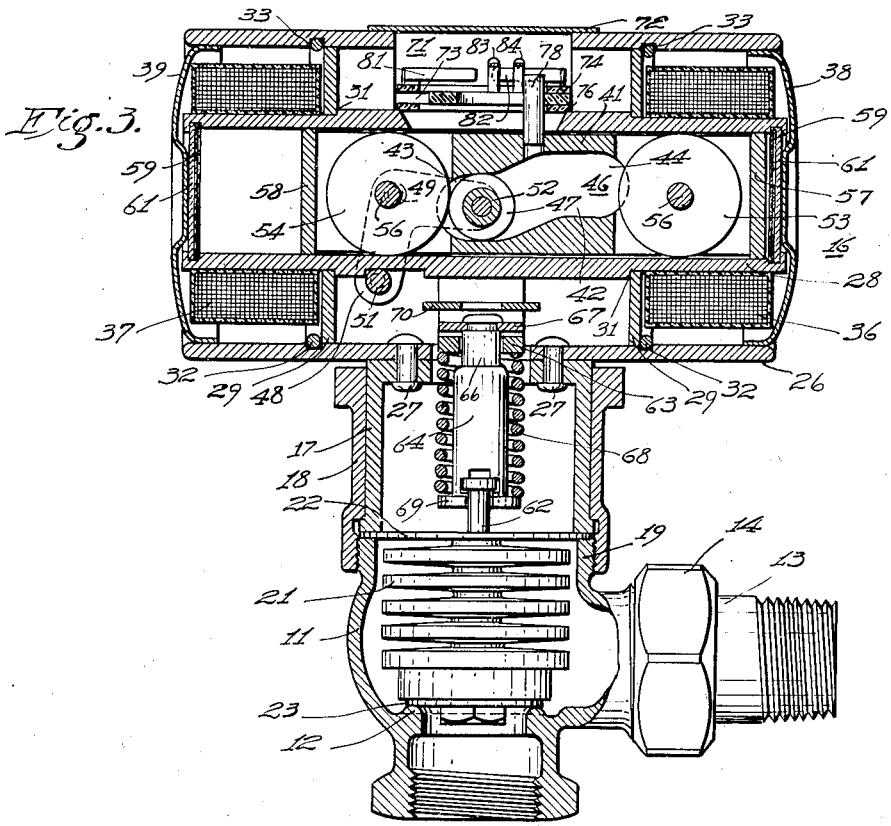
Figure 4:
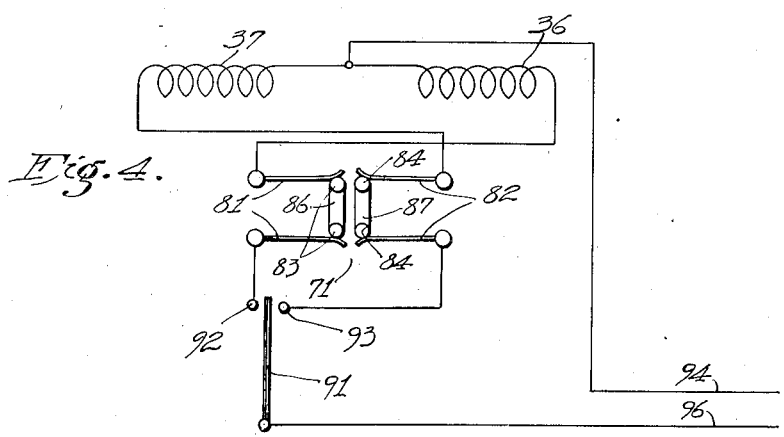

In the drawings,

Figure 1 is a view, in longitudinal section, through a valve-actuating structure embodying my invention, Fig. 2 is a view, in longitudinal section, taken on the line II—II of Fig. 1, Fig. 3 is a view, in longitudinal section, through a device embodying my invention, similar to the view shown in Fig. 1, but showing the valve in closed position, and, Fig. 4 is a diagram of connections used with my electromagnetic valve.

A valve casing 11 includes a valve seat 12 and, while I have shown a valve of the L-type, I do not desire to be limited thereto. A short length of pipe 13 is secured to one portion of the valve 11, as by a clamping nut 14.

An electromagnetic valve-actuating structure 16 is removably mounted, in operative position, on the upper end of the valve casing 11 and includes a base 17, which is substantially circular shape, and a base nut 18 fitting around the tubular base 17 and projecting beyond the lower end thereof, the projecting lower end being provided with screw threads to fit on, and have screw-threaded engagement with, the upper portion 19 of the casing 12. In order to insure that there shall be no leakage of heating fluid out of the casing 11, I provide an expansion member 21 of the bellows type, having an upper end plate 22 and a lower valve disk 23. The plate 22 is clamped between the bottom edge of base 17 and portion 19 of the casing. The valve plate or disk 23 is caused to engage the seat 12 to close the valve.

The valve elements hereinbefore described and the member 21 are old in the art, and the structure included in element 16 and to be hereinafter described constitutes, more particularly, the device embodying my invention. An outer tubular shell 26, which is preferably made of magnetic material, is suitably secured against the base 17 at its upper curved portion by rivets 27.

An inner tubular casing or shell 28 is substantially coaxial and coextensive with the outer shell or casing 26 and is made of non-magnetic material. Means for holding the inner casing or shell within the outer shell includes a pair of spaced metal members 29, both of annular shape, the inner peripheral surface fitting over and against a shoulder portion 31 on the inner shell 28, as is shown more particularly in Figs. 1 and 3 of the drawings. The rings 29 are held in their proper operative positions, as shown, by metal spring rings 32 which expand into inner annular grooves 33, located in the outer shell 26.

Actuating coils 36 and 37, suitably wound and covered with electric-insulating material, in a manner well known in the art, are located adjacent to the ends of the inner shell 28 and may fit tightly thereon, their inner side surfaces operatively engaging the annular members 29. Cover members 38 and 39, of substantially dish-shape, fit resiliently within the ends of the outer tubular member 26 to thereby close the otherwise open ends thereof and suitably protect not only the actuating coils but also other mechanism located therein.

An armature core for energization by the actuating or energizing coils 36 and 37 includes a cylindrical member 41 of electromagnetic material which fits loosely within the inner shell 28. The core 41 is provided with an angularly extending slot 42 which includes three connected portions, namely, one end portion 43 extending longitudinally of the core, on one side of the axis thereof, a second straight and longitudinally-extending end portion 44 located at the other side of the axis of the core and an intermediate angularly-extending connecting portion 46, all as shown in Figs. 1 and 3 of the drawings. A roller 47 is located within the slot 42 and is adapted to be located in either the portion 43, when the valve is in its closed position, or in the portion 44, when the valve is in its open position.

Means for preventing longitudinal movement of the roller 47 includes a member of substantially U-shape, the side portions 48 of which are each of substantially L-shape and are pivotally secured on rivets 49, which are supported by the inner shell 28. The lower end portions of the side arms 48 are connected by an elongated pin or stud 51. The other ends of the arms 48 are traversed by an elongated pin 52 which extends also through the roller 47.

As was hereinbefore stated, the core member 41 is relatively loose in the inner shell 28 and, in order to center it and reduce the friction between its outer surface and the inner surface of inner shell 28, I provide a pair of rollers 53 and 54 which are rotatably mounted on laterally extending pins 56 which are fitted tightly in the core member 41, it being understood that recesses extend longitudinally of the core member at the ends thereof to receive the rollers.

In order to provide a dash-pot action, washers 57 and 58, which may be made of metal, are suitably secured to the ends of the core member 41 and fit more tightly within the shell 28 than does the core member 41. A fiber washer 59 and a metal washer 61 are provided within the inner shell 28, at the outer ends thereof, to constitute noise-deadening stopping means for the core member in its reciprocal movement in the shell 28.

Mechanical means, operatively connecting the roller 47 and a valve stem 62, includes a yoke member 63 of substantially U-shape, the end portions of which are provided with an opening therethrough into which the hereinbefore-mentioned pin 52 may fit. Rod 64 has a lost-motion connection to the valve stem 62 which is secured to the valve disk 23 in any desired manner, and the upper end of rod 64 has a lost-motion connection to the intermediate portion of the yoke 63, as by a reduced end portion 66 (see particularly Figs. 1 and 3), and a washer 67, a spring 68 extending between the outer surface of the intermediate portion of member 63 and a flange 69 at the lower end of rod 64.

A member 70, of substantially U-shape and of relatively thin metal, has its ends fitting over reduced end portions of the roller 47, in a manner shown more particularly in Fig. 2 of the drawings, to hold the roller in substantially proper operative position relatively to the core and the inner shell and also to permit of easy assembly.

A circuit-controlling switch 71 is located immediately above the central portion of the inner shell 28 and within or below a removable cover member 72 on the outer shell which normally closes an opening provided in the outer shell for the insertion and removal of this switch structure. The switch includes two fixed plates 73 of electric insulating material with two side plates 74 and 76 secured thereto and a movable plate 77, also of electric-insulating material, which may be reciprocally moved by a pin 78 having its lower end fitted into an opening in core member 41 and extending upwardly through an opening in the plate 73 and also an opening in plate 77. Pairs of resilient contact members 81 and 82 are located as shown more particularly in Fig. 4 of the drawings, and member 77 has two pairs of spaced metallic contact pins 83 and 84 mounted thereon and connected by the laterally-extending arms 86 and 87 to engage the respective pairs of arms 81 or 82. The distance between the contact pins 83 and 84 is such that, as shown in Fig. 4 of the drawings, both pairs of resilient contact arms 81 and 82 are simultaneously engaged at the time when roller 47 is in the portion 46 of slot 42. The connections of the two actuating coils 36 and 37, and of the circuit-controlling switch are evident from Fig. 4 of the drawings.

As was hereinbefore stated, the device embodying my invention has been developed for use in a heating system of the kind in which either a vacuum or a pressure is present in the system, and it will be noted that, when the core member 41 has been actuated to its left-hand position, as shown in Fig. 1 of the drawings, the roller 47 will be in a position farthest away from the valve casing and the valve seat so that the valve disk 23 is out of engagement with the seat 12, and the valve is, therefore, open. As the straight portion 44 is relatively long, there is no possibility that slight vibrations, such as may be present in a building, will permit movement of the core member 41 to the right to permit the roller 47 to move into the angularly-extending intermediate portion of the slot, whereby the valve disk might tend to move into or toward its closed position, as might be the case, if a pressure or suction should so operate on the valve disk as to tend to cause it to close.

If coil 36 is energized momentarily, as by the action of bimetal thermostat 91 engaging the "high" contact 92, the circuit including supply circuit conductors 94 and 96 of Fig. 4, the core member 41 will be moved quickly toward the right-hand limit of its travel, as is shown in Fig. 3 of the drawings, and the valve stem and the valve disk will be moved downwardly to close the valve, as shown in Fig. 3 of the drawings. The roller 47 will now be in portion 43 of the slot in the core member, but it is to be noticed that the slight lost-motion connection between the valve stem 62 and the rod 64 provides a different point of engagement therebetween, and that the heretofore existing engagement between washer 67 and yoke 63 no longer exists for the reason that the travel of roller 47 in a direction longitudinally of valve stem 62 is greater than was necessary to close the valve or to cause the disk 23 to be fitted upon the seat 12. This effects compression of the spring 68, and, in the final positions of the valve parts of the actuating structure, as shown in Fig. 3 of the drawings, the pressure between the valve disk and the valve seat is determined solely by the spring 68 and the degree of movement between washer 67 and yoke 63.

If the room temperature drops, the bar 91 may engage the "low" contact terminal 93 to thereby close a circuit through coil 37, thereby causing the core structure to move toward the left and open the valve.

It will be obvious that pressure against the valve disk 23, from a portion of the piping system located therebelow, will not permit opening of the valve when the same is in its closed position, neither will a suction thereon, when the valve is open, tend to move it to its closed position and, hence, the device embodying my invention provides what may be termed a positive-action movement or means for positively holding a valve disk in its open or in its closed position.

Various modifications may be made in my invention without departing from the spirit and scope thereof, and I desire, therefore, that only such limitations shall be placed upon the invention as are imposed by the prior art or are set forth in the appended claims.

I claim as my invention:

1. Actuating means for a valve having a valve casing and a valve stem, said means including a tubular shell, a pair of spacing rings in said shell, a tubular member supported by said spacing rings, spaced actuating coils on said tubular member, a reciprocally movable core structure in said tubular member having an angularly-extending slot therein, a roller movable in said slot, and resilient means connecting the roller and the valve stem and effective to determine the pressure of a valve actuated thereby upon its seat.

2. Actuating means for a valve having a valve casing and a valve stem, said means including a magnetically-actuated longitudinally-reciprocally movable member having an angularly extending slot therein, a roller movable in the slot, a mechanical link connecting the roller and the valve stem, and means pivotally engaging the roller to preclude movement thereof with the longitudinally-reciprocal member.

3. In an actuating means for a valve having a casing and a valve stem, an outer tubular casing secured to the valve casing, an inner tubular casing spaced from the outer tubular casing, a movable core member in the inner tubular casing for controlling the position of the valve stem, spaced annular members between the inner and the outer tubular members for supporting the inner tubular member co-axially with the outer tubular member, and spring rings engaging the respective annular members to position them in said outer tubular member.

4. Actuating means for a valve having a valve casing and a valve stem, said means including a tubular shell, actuating coils at the ends of the shell, a core member reciprocally movable in said shell and fitting loosely therein, mechanical means connecting the core member and the valve stem, and a roller in the core member fitting snugly in the tubular shell to carry the movable core member and decrease the friction therebetween.

5. The device of claim 2 in which the reciprocally-movable member travels in a path at right angles to the path of travel of the valve stem.

6. Actuating means for a valve having a valve casing and a valve stem, said means including a horizontally extending tubular shell, a reciprocally-movable cylindrical member in said tubular shell and fitting loosely therein, rollers in the cylindrical member for centering it in the shell supporting its weight therein, and reducing friction therebetween and a mechanical connection between the cylindrical member and the valve stem.

In testimony whereof, I have hereunto subscribed my name this 24th day of Feb., 1931.

WARNER T. TABB.